United States Patent [19]

Shinagawa et al.

[11] Patent Number: 5,049,773
[45] Date of Patent: Sep. 17, 1991

[54] STATOR ASSEMBLY FOR MOTOR

[75] Inventors: Kenji Shinagawa; Takeshi Iitsuka, both of Katsuta, Japan

[73] Assignee: Hitachi Koki Company, Limited, Tokyo, Japan

[21] Appl. No.: 447,457

[22] Filed: Dec. 7, 1989

[30] Foreign Application Priority Data

Dec. 9, 1988 [JP] Japan .......................... 63-160641[U]

[51] Int. Cl.$^5$ .......................... H02K 11/00; H02K 5/08
[52] U.S. Cl. .................................... 310/254; 310/71; 310/86; 310/179
[58] Field of Search .................. 310/254, 71, 179, 42, 310/43, 45, 85, 86, 88

[56] References Cited

U.S. PATENT DOCUMENTS 4,973,871  11/1990  Bisantz ............................... 310/154

Primary Examiner—Steven L. Stephan
Assistant Examiner—Judson H. Jones
Attorney, Agent, or Firm—Pollock, VandeSande & Priddy

[57] ABSTRACT

A stator assembly for use in an electric motor includes a stator core, a coil wound in the stator core and having terminal ends connected to leads, two sheets of insulation paper interposed between the stator core and the coil, and two auxiliary insulation plates extending between ends of the sheets of insulation paper and pole tongue ends of the stator core. The auxiliary insulation plate has engaging portions held in abutting engagement with the pole tongue ends. The engaging portions comprise opposite edge portions cut and bent from opposite ends of the auxiliary insulation plate toward one side thereof.

3 Claims, 3 Drawing Sheets

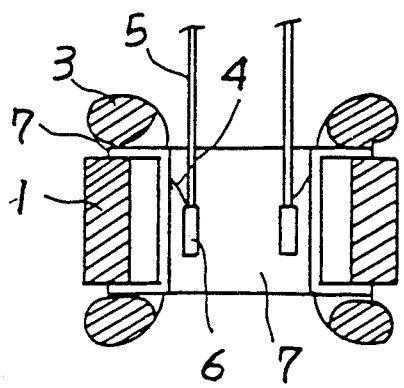
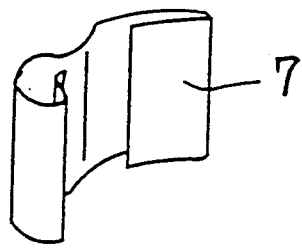
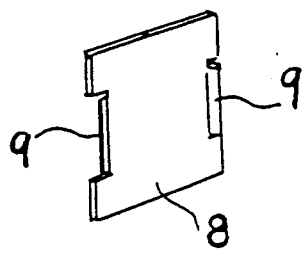
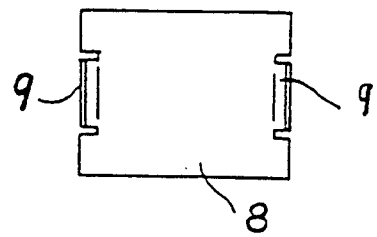
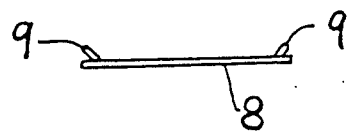

STATOR ASSEMBLY FOR MOTOR

BACKGROUND OF THE INVENTION

The present invention relates to a stator assembly for a motor, and more particularly to a motor stator assembly having auxiliary plates between the pole tongue ends of magnetic poles of a stator core.

Stator assemblies for motors have a coil wound in a stator core with sheets of insulation paper interposed therebetween. The coil has terminal ends connected to leads, respectively, which are positioned inside of the stator core. Auxiliary insulation plates are disposed inwardly of and held against the joints between the coil terminal ends and the leads so that the joints will not project into contact with a rotor.

Each of the auxiliary insulation plates has its opposite ends sandwiched in place between the sheets of insulation paper and the pole tongue ends of the stator core. The auxiliary insulation plates thus placed may however not be positioned in desired locations. Even if the auxiliary insulation plates are properly installed they tend to be subsequently displaced out of position as they are not securely held in place.

SUMMARY OF THE INVENTION

It is an object of the present invention to provide a motor stator assembly which includes auxiliary insulation plates that can be installed in place efficiently and reliably secured in position against accidental displacement.

According to the present invention, there is provided a stator assembly for use in an electric motor including a stator core, a coil wound in the stator core and having terminal ends connected to leads, two sheets of insulation paper interposed between the stator core and the coil, and two auxiliary insulation plate extending between ends of the sheets of insulation paper and pole tongue ends of the stator core. The auxiliary insulation plate has engaging portions held in abutting engagement with the pole tongue ends. The engaging portions comprise opposite edge portions cut and bent from opposite ends of the auxiliary insulation plate toward one side thereof. The auxiliary insulation plates are securely held in place against accidental displacement since the engaging portions abut against the pole tongue ends of the stator core. Furthermore, the auxiliary insulation plates can be installed reliably in desired location without error because of the edge portions engaging the pole tongue ends. Consequently, the auxiliary insulation plates can be combined into the stator assembly efficiently. As a result, the stator assembly can be assembled efficiently and is highly reliable in operation.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 3 is a cross-sectional view taken along line III—III of FIG. 1;

FIG. 4 is a perspective view of a sheet of insulation paper;

FIG. 5 is a perspective view of an auxiliary insulation plate;

FIG. 6 is a front elevational view of the auxiliary insulation plate;

FIG. 7 is a side elevational view of the auxiliary insulation plate;

DETAILED DESCRIPTION

Figure 1:
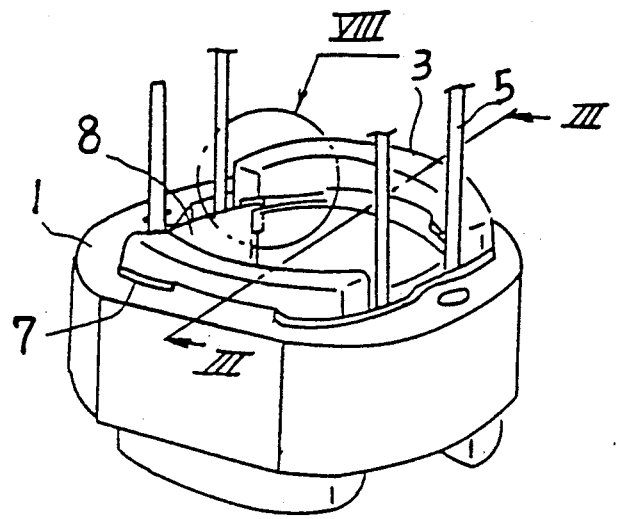
FIG. 1 is a perspective view of a stator assembly according to the present invention.
Figure 2:
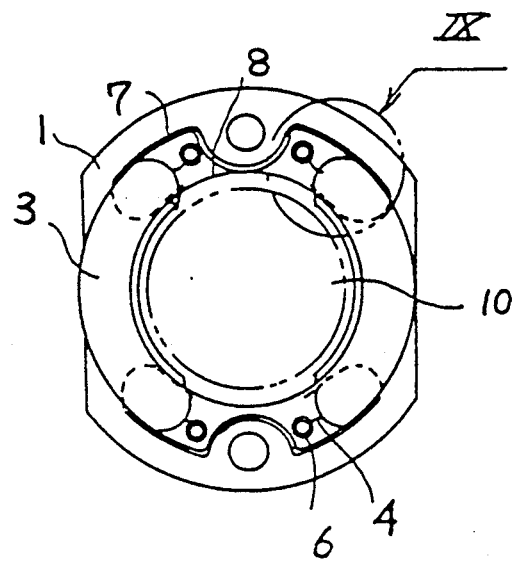
FIG. 2 is a front elevational view of the stator assembly shown in FIG. 1.

As shown in FIGS. 1 through 3, a stator assembly for an electric motor includes a stator core 1 with a coil 3 wound therein. Two sheets 7 of insulation paper (each shaped as shown in FIG. 4) are interposed between the stator core 1 and the coil 3 and positioned in diametrically opposite relation to each other. The coil 3 has terminal ends 4 connected to leads 5 at joints 6 located inside of the stator core 1.

To prevent the joints 6 from projecting into contact with a rotor 10 (FIG. 9) which will be assembled in the stator assembly, a pair of diametrically opposite auxiliary insulation plates 8 is disposed radially inwardly of the joints 6. As shown in FIGS. 5, 6, and 7, each of the auxiliary insulation plates 8 is of a rectangular shape, and has opposite edge portions 9 cut and bent as engaging portions from opposite ends thereof toward one side of the auxiliary insulation plate 8. The opposite edge portions 9 project radially inwardly with respect to the stator core 1.

Figure 8:
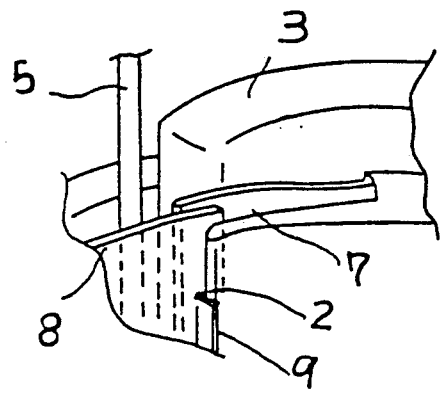
FIG. 8 is an enlarged fragmentary perspective view showing an encircled area VIII in FIG. 1.
Figure 9:
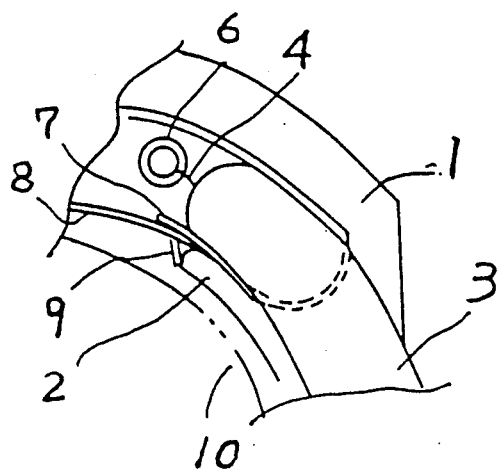
FIG. 9 is an enlarged fragmentary perspective view showing an encircled area IX in FIG. 2.

As shown in FIGS. 8 and 9, each auxiliary insulation plate 8 is installed radially between the folded edges of one of the insulation paper sheets 7 and opposite ends 2 of two diametrically opposite pole tongues of the stator core 1. The edge portions 9 of the auxiliary insulation plate 8 are held in abutting engagement with the pole tongue ends 2 of the stator core 1. Therefore, the auxiliary insulation plates 8 are securely held in place against accidental displacement. Since the auxiliary insulation plates 8 can be installed reliably in desired location without error because of the edge portions 9 engaging the pole tongue ends 2, the auxiliary insulation plates 8 can be combined into the stator assembly efficiently. As a result, the stator assembly can be assembled efficiently and is highly reliable in operation.

Although a certain preferred embodiment has been shown and described, it should be understood that many changes and modifications may be made therein without departing from the scope of the appended claims.

What is claimed is:

1. A stator assembly for use in an electric motor, comprising:
   a stator core having pole tongue ends;
   a coil wound in said stator core and having terminal ends;
   a plurality of leads connected to said terminal ends at joints;
   at least one sheet of insulation paper interposed between said stator core and said coil; and
   at least one auxiliary insulation plate extending between ends of said sheet of insulation paper and said pole tongue ends of the stator core, said auxiliary insulation plate having engaging portions held in abutting engagement with said pole tongue ends.

2. A stator assembly according to claim 1, wherein said engaging portions comprise opposite edge portions cut and bent from opposite ends of said auxiliary insulation plate toward one side thereof.

3. A stator assembly according to claim 2, wherein said edge portions project radially inwardly with respect to said stator core.

* * * * *